United States Patent
Kato et al.

(10) Patent No.: US 12,343,793 B2
(45) Date of Patent: Jul. 1, 2025

(54) SCUM ADSORBING MEMBER, TWIN ROLL CONTINUOUS CASTING DEVICE, AND METHOD OF PRODUCING SLAB

(71) Applicant: NIPPON STEEL CORPORATION, Tokyo (JP)

(72) Inventors: Yuichi Kato, Tokyo (JP); Naotsugu Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 224 days.

(21) Appl. No.: 17/282,123

(22) PCT Filed: Oct. 16, 2018

(86) PCT No.: PCT/JP2018/038536
§ 371 (c)(1),
(2) Date: Apr. 1, 2021

(87) PCT Pub. No.: WO2020/079758
PCT Pub. Date: Apr. 23, 2020

(65) Prior Publication Data
US 2021/0370390 A1 Dec. 2, 2021

(51) Int. Cl.
*B22D 43/00* (2006.01)
*B22D 11/06* (2006.01)
*C04B 38/00* (2006.01)

(52) U.S. Cl.
CPC .............. *B22D 43/00* (2013.01); *B22D 11/06* (2013.01); *C04B 38/0054* (2013.01);
(Continued)

(58) Field of Classification Search
CPC .... B22D 43/00; B22D 43/001; B22D 43/002; B22D 43/004; B22D 43/005; B22D 43/007; B22D 11/06
See application file for complete search history.

(56) References Cited

U.S. PATENT DOCUMENTS

| 3,483,913 A | * | 12/1969 | Grosvenor | ................. C22B 9/02 |
| | | | | 164/55.1 |
| 2004/0251583 A1 | | 12/2004 | Park et al. | |
| 2016/0221079 A1 | * | 8/2016 | Goettsch | ................. B22D 17/28 |

FOREIGN PATENT DOCUMENTS

| CN | 101448558 A | 6/2009 |
| JP | S63-115667 A | 5/1988 |

(Continued)

OTHER PUBLICATIONS

JIS R 1655:2003 "Test methods for pore size distribution of fine ceramic green body by mercury porosimetry", (2003).
(Continued)

*Primary Examiner* — Kevin P Kerns
*Assistant Examiner* — Steven S Ha
(74) *Attorney, Agent, or Firm* — Myers Wolin, LLC

(57) ABSTRACT

A scum adsorbing member provided in a twin roll continuous casting device to produce a slab by supplying a molten metal to a molten metal storage section formed by a pair of rotatable cooling rolls and a pair of side weirs, and forming and growing a solidified shell on each circumferential surface of the pair of cooling rolls, so that a part of the scum adsorbing member is immersed in the molten metal storage section includes a refractory containing a refractory metal oxide, wherein the scum adsorbing member has 15% by volume or more and 70% by volume or less of pores.

8 Claims, 5 Drawing Sheets

(52) U.S. Cl.
 CPC ............ *C04B 2235/3206* (2013.01); *C04B 2235/3208* (2013.01); *C04B 2235/3217* (2013.01); *C04B 2235/3244* (2013.01); *C04B 2235/3418* (2013.01)

(56) References Cited

FOREIGN PATENT DOCUMENTS

| | | |
|---|---|---|
| JP | H03-66450 A | 3/1991 |
| JP | H04-197560 A | 7/1992 |
| JP | H04-253552 A | 9/1992 |
| JP | H04-300055 A | 10/1992 |
| JP | H06-122067 A | 5/1994 |
| JP | H06-339754 A | 12/1994 |
| JP | H07-214248 A | 8/1995 |
| JP | H08-155593 A | 6/1996 |
| JP | 2002-219564 A | 8/2002 |
| JP | 2002-273551 A | 9/2002 |
| JP | 2003-39139 A | 2/2003 |
| JP | 2003-266154 A | 9/2003 |
| JP | 2003-311385 A | 11/2003 |
| JP | 2015-62948 A | 4/2015 |
| JP | 2018-176250 A | 11/2018 |
| KR | 10-0544578 B1 | 1/2006 |
| KR | 10-0674619 B1 | 1/2007 |
| KR | 10-1778391 B1 | 9/2017 |
| WO | 2007/021705 A2 | 2/2007 |

OTHER PUBLICATIONS

JIS R 2205-1992 "Testing method for apparent porosity, water absorption specific gravity of refractory bricks", (1992).

\* cited by examiner

SCUM ADSORBING MEMBER, TWIN ROLL CONTINUOUS CASTING DEVICE, AND METHOD OF PRODUCING SLAB

CROSS-REFERENCE TO RELATED APPLICATION

This application is a National Phase of PCT/JP2018/038536, filed on Oct. 16, 2018, and which designated the U.S. The contents of which are wholly incorporated herein by reference.

TECHNICAL FIELD

The present disclosure relates to a scum adsorbing member, a twin roll continuous casting device in which the scum adsorbing member is used, and a method of producing a slab.

RELATED ART

For production of metal thin slabs (hereinafter sometimes referred to as cast strips), twin roll continuous casting devices are provided that have a water-cooling structure inside and are equipped with a pair of rotatable cooling rolls that rotate in opposite directions. In such a twin roll continuous casting device, a molten metal is supplied to a molten metal storage section including a pair of rotating cooling rolls and a pair of side weirs, and solidified shells that are formed and grown on the circumferential surfaces of the pair of cooling rolls are attached to each other by pressure at a roll kiss point to produce a slab having a predetermined thickness. Such a twin roll continuous casting device is applied to various metals.

In the above-described molten metal storage section, an oxide or the like floats on the molten metal surface in the molten metal storage section to form a film-like foreign substance called a scum, and there is a possibility that the scum is intermittently caught between the circumferential surfaces of the cooling rolls. The caught scum causes a surface defect such as a surface crack or a surface flaw of the slab.

Therefore, the following techniques have been proposed as a method of suppressing a surface defect by removing or inactivating scum at the time of casting a slab using the above-described twin roll continuous casting device.

For example, Patent Document 1 proposes to prevent scum from being caught in a solidified shell by placing a solid oxide at the interface between the molten metal and the gas phase in a molten metal storage section and capturing the scum.

Patent Document 2 proposes a technique of preventing scum from being caught between a cooling roll and a solidified shell by injecting an inert gas and guiding the generated scum to the vicinity of a side weir.

Patent Document 3 proposes a technique of preventing scum from being caught between a cooling roll and a solidified shell by guiding the scum to the vicinity of a side weir using a discharge flow from an immersion nozzle.

Patent Document 4 proposes a technique in which by installing a pair of scum weirs along the width direction of a cooling roll in a molten metal storage section to calm the flow of a molten metal discharged from an immersion nozzle, the molten metal is prevented from rippling, the flow of the molten metal is controlled, and scum is prevented from being caught in a solidified shell.

Patent Document 5 proposes a technique of keeping the effect of flow control for a long period of time by preparing a scum weir with a material having poor wettability with a scum to suppress the adhesion of the scum to the scum weir.

Patent Document 6 proposes the use of a scum weir that is produced with a further low-cost material, can withstand use with almost no preheating, and has high thermal shock resistance.

Patent Document 7 proposes a scum weir prepared with a material containing an element that increases the surface tension of a molten metal. By dissolving the element that increases the surface tension into the molten metal, the adhesion of scum to the scum weir can be suppressed.

Patent Document 8 proposes a scum weir prepared with $Al_2O_3$, with which scum is adsorbed and prevented from being caught in a thin slab.

CITATION LIST

Patent Document

[Patent Document 1]
   Japanese Unexamined Patent Application, First Publication No. 2002-273551
[Patent Document 2]
   Japanese Unexamined Patent Application, First Publication No. H04-197560
[Patent Document 3]
   Japanese Unexamined Patent Application, First Publication No. H06-339754
[Patent Document 4]
   Japanese Unexamined Patent Application, First Publication No. H08-155593
[Patent Document 5]
   Japanese Unexamined Patent Application, First Publication No. H07-214248
[Patent Document 6]
   Japanese Unexamined Patent Application, First Publication No. 2003-039139
[Patent Document 7]
   Japanese Unexamined Patent Application, First Publication No. 2003-266154
[Patent Document 8]
   Japanese Unexamined Patent Application, First Publication No. H03-066450

SUMMARY

Problems to be Solved

The method disclosed in Patent Document 1 has a problem that the detection of the molten metal surface level is difficult because the molten metal surface is covered with the solid oxide. In addition, if the solid oxide and the cooling roll are placed close to each other, the possibility is increased that the scum grown by adhering to the solid oxide will come into contact with the cooling roll, and there is a possibility that the scum will be caught in the thin slab.

In the methods disclosed in Patent Documents 2 and 3, when the total amount of the scum is large due to the increased casting time, it is difficult to keep the scum only in the vicinity of the side weir, and there is a problem that the effect of preventing the occurrence of a surface defect is reduced.

In the methods disclosed in Patent Documents 4, 5, and 6, when the total amount of the scum is large, the scum cannot be prevented from being caught in the solidified shell, and there is a problem that long-time casting is difficult after all.

In the method disclosed in Patent Document 7, the scum weir exerts its function by dissolving the component of the scum weir into the molten metal, therefore, there is a problem that the component of the molten metal changes due to the dissolving of the scum weir component.

The method disclosed in Patent Document 8 has a problem that the amount of the scum adsorbed is limited and that the scum weir cannot be used for a long period of time due to erosion depending on the composition of the scum.

As described above, it is impossible to sufficiently suppress the catching of the scum for a long period of time by the conventional techniques.

The present disclosure has been made in view of the above-described situation, and an object of the present disclosure is to provide a scum adsorbing member that has thermal shock resistance so that the scum adsorbing member does not crack even when in contact with a molten metal even when it has been subjected to almost no preheating, is not subjected to erosion loss even under a casting time of longer than 6 hours, and absorbs scum in its pores and removes the scum by adsorption to suppress the catching of the scum in a solidified shell, a twin roll continuous casting device in which the scum adsorbing member is used, and a method of producing a slab.

Means for Solving the Problem

The gist of the present disclosure is as follows.

(1) A first aspect of the present disclosure is a scum adsorbing member provided in a twin roll continuous casting device to produce a slab by supplying a molten metal to a molten metal storage section formed by a pair of rotatable cooling rolls and a pair of side weirs, and forming and growing a solidified shell on each circumferential surface of the pair of cooling rolls, so that a part of the scum adsorbing member is immersed in the molten metal storage section, comprising a refractory containing a refractory metal oxide, wherein the scum adsorbing member has 15% by volume or more and 70% by volume or less of pores.

(2) The scum adsorbing member described in (1) above may be attached to a reinforcing member.

(3) The scum adsorbing member described in (2) above may include a porous sheet including a ceramic fiber.

(4) In the scum adsorbing member described in any one of (1) to (3) above, the refractory metal oxide may be at least one, or two or more selected from the group consisting of $Al_2O_3$, $ZrO_2$, MgO, $SiO_2$, and $CaO \cdot 6Al_2O_3$.

(5) In the scum adsorbing member described in any one of (1) to (4) above, the average pore size of the pores may be 10 μm or more and less than 50 μm.

(6) In the scum adsorbing member described in any one of (1) to (5) above, the volume ratio of the pores may be 20% by volume or more and less than 50% by volume.

(7) A second aspect of the present disclosure is a twin roll continuous casting device including: a molten metal storage section including a pair of rotatable cooling rolls that rotate and a pair of side weirs; and the scum adsorbing member described in any one of (1) to (6) above, provided so that a part of the scum adsorbing member is immersed in the molten metal storage section, wherein a slab is produced by supplying a molten metal to the molten metal storage section and forming and growing a solidified shell on each circumferential surface of the pair of cooling rolls.

(8) A third aspect of the present disclosure is a method of producing a slab, the method including: supplying a molten metal to a molten metal storage section including a pair of rotatable cooling rolls that rotate and a pair of side weirs; and forming and growing a solidified shell on each circumferential surface of the pair of cooling rolls, wherein the scum adsorbing member described in any one of (1) to (6) above is provided so that a part of the scum adsorbing member is immersed in the molten metal storage section.

Effects

According to the present disclosure, it is possible to provide a scum adsorbing member that has thermal shock resistance so that the scum adsorbing member does not crack even when in contact with a molten metal even when it has been subjected to almost no preheating, is not subjected to erosion loss even under a casting time of longer than 6 hours, and absorbs scum in its pores and removes the scum by adsorption to suppress the catching of the scum in a solidified shell, a twin roll continuous casting device in which the scum adsorbing member is used, and a method of producing a slab.

More specifically, according to the scum adsorbing member described in (1) to (6) above, because the scum adsorbing member includes a refractory containing a refractory metal oxide and has 15% by volume or more of pores, the absorption space for thermal expansion is ensured to improve the thermal shock resistance, and the scum adsorbing member can sufficiently adsorb scum with the pores. In addition, because the volume ratio of the pores is 70% by volume or less, the strength is ensured to suppress breakage due to the flow of a molten metal or the like. As described above, the scum adsorbing member is excellent in thermal shock resistance, and catching of scum can be sufficiently suppressed for a long period of time, therefore, it is possible to cast a slab stably.

In particular, according to the scum adsorbing member described in (2) above, because the strength of the scum adsorbing member is ensured by the reinforcing member, breakage due to the flow of a molten metal or the like can be suppressed. Furthermore, the size of the scum adsorbing member can be reduced, and maintenance such as replacement or repair is easy.

Furthermore, according to the scum adsorbing member described in (3) above, because the scum adsorbing member attached to the reinforcing member includes a porous sheet including a ceramic fiber, the structure is very simple. In addition, by selecting an appropriate porous sheet depending on the casting condition in consideration of thermal conductivity, heat resistance, and the like, it is possible to suppress the formation and the growth of a bare metal on the surface of the scum adsorbing member certainly.

Furthermore, according to the scum adsorbing member described in (4) above, by selecting a material excellent in various properties such as scum adsorptivity, thermal shock resistance, and corrosion resistance to scum, it is possible to apply the scum adsorbing member depending on various casting conditions, resulting in stable casting for a long period of time.

Furthermore, according to the scum adsorbing member described in (5) above, because the average pore size of the pores is within the range of 10 μm or more and less than 50 μm, the scum adsorbing member can sufficiently adsorb scum. The average pore size of the pores is measured by mercury porosimetry (JIS R 1655 (2003)), and the pore size at a cumulative volume ratio of 50% is regarded as the "average pore size of the pores".

Furthermore, according to the scum adsorbing member described in (6) above, because the volume ratio of the pores is 20% by volume or more, the absorption space for thermal expansion is certainly ensured to improve the thermal shock resistance sufficiently, and the scum adsorbing member can sufficiently adsorb scum with the pores. In addition, because the volume ratio of the pores is 50% by volume or less, the strength is sufficiently ensured to suppress breakage due to the flow of a molten metal or the like.

Furthermore, according to the twin roll continuous casting device and the method of producing a slab described in (7) and (8) above, because the scum adsorbing member is provided in the molten metal storage section, the scum adsorbing member can adsorb scum to suppress catching of scum in the cooling rolls. In addition, the scum adsorbing member is excellent in thermal shock resistance and strength, and can be used for a long period of time. Therefore, it is possible to cast a slab having excellent surface quality stably.

DETAILED DESCRIPTION

Figure 1:
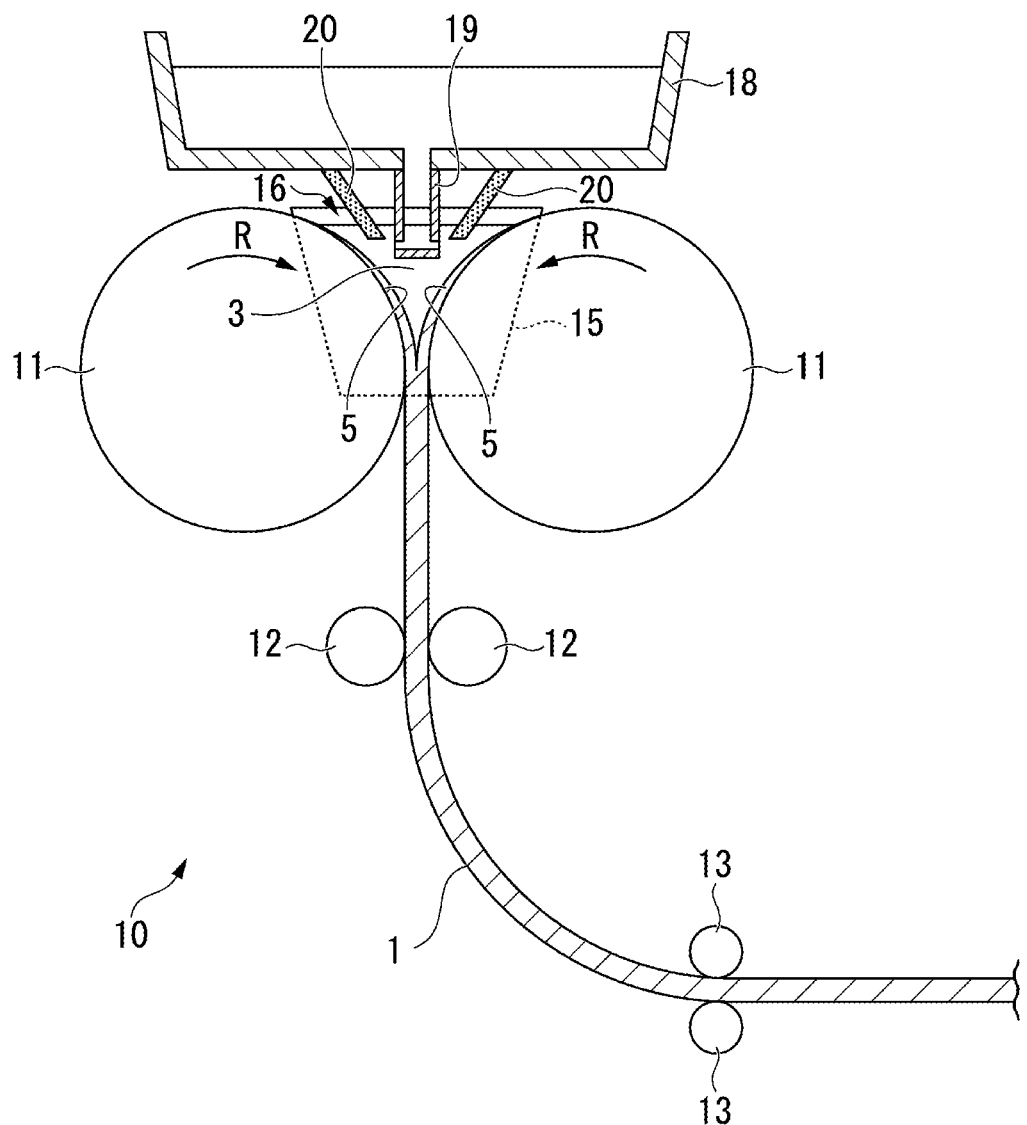
FIG. 1 is an explanatory view showing an example of a twin roll continuous casting device in which a scum adsorbing member according to an embodiment of the present disclosure is used.

As a result of intensive studies to solve the above-described problems, the present inventors have obtained the following findings.

Conventionally, measures for stable use of a scum weir have focused on a method of suppressing scum adhesion to a scum weir. Specifically, a method has been adopted in which contact with scum is prevented using a material system including C, which is less likely to be wet with scum. However, this method has a problem that scum is caught in a solidified shell to deteriorate the slab quality. Furthermore, in the material system including C, there is a problem that when the adhesion of a bare metal to the scum weir proceeds, the bare metal is detached and caught in the thin slab. These problems are due to the property of C, which has high thermal conductivity and is less likely to be wet with scum, and it is difficult to solve these problems in the case that C is used.

Meanwhile, in order to suppress catching of scum in a slab, a method of adsorbing scum by a scum weir including $Al_2O_3$ was considered. However, the scum weir simply including $Al_2O_3$ adsorbs scum only in a low amount, and in the case that the scum weir is used for scum having a composition including CaO, the erosion loss of the scum weir occurs to deteriorate the durability. As described above, by the conventionally studied methods, no scum weir has been obtained that satisfies a required property.

As a result of intensive studies, the present inventors have found that high thermal shock resistance can be realized by appropriately controlling the pores of a scum weir so that the pores function as an absorption space for expansion, and that the adhesion of a bare metal can be suppressed owing to the high heat insulating property in the case that the volume ratio of the pores (hereinafter also referred to as porosity) is high while the pores function as the adsorption space for scum to maintain the adsorption of the scum for a long period of time. Furthermore, the present inventors found that by appropriately controlling the material included in the scum weir, the erosion rate due to scum can be reduced even if the scum weir has a high porosity, and that high corrosion resistance can be also realized.

Hereinafter, the scum adsorbing member according to an embodiment of the present disclosure made based on the above-described findings will be described with reference to the attached drawings. In the embodiments described below, the metal to be cast will be described as steel. The present disclosure is not limited to the embodiments described below.

In the present embodiment, molten steel is used as a molten metal, and a slab 1 including steel is produced. Examples of the steel include 0.001 to 0.01% C extremely low carbon steel, 0.02 to 0.05% C low carbon steel, 0.06 to 0.4% C medium carbon steel, 0.5 to 1.2% C high carbon steel, austenitic stainless steel represented by SUS304 steel, ferritic stainless steel represented by SUS430 steel, 3.0 to 3.5% Si oriented electromagnetic steel, and 0.1 to 6.5% Si non-oriented electromagnetic steel (note that the unit "%" means % by mass).

In the present embodiment, the produced slab 1 has a width within the range of 200 mm or more and 1,800 mm or less, and a thickness within the range of 0.8 mm or more and 5 mm or less.

A twin roll continuous casting device 10 will be described to which a scum adsorbing member 20 according to the present embodiment is applied.

The twin roll continuous casting device 10 is a device to produce the slab 1, and as shown in FIGS. 1 to 4, includes a pair of cooling rolls 11,11, upstream pinch rolls 12 and 12, downstream pinch rolls 13 and 13, a pair of side weirs 15 and 15, a tundish 18, and an immersion nozzle 19.

The upstream pinch rolls 12 and 12 and the downstream pinch rolls 13 and 13 are provided downstream of the pair of cooling rolls 11 and 11, and support the slab 1.

The pair of side weirs 15 and 15 are provided at both the ends of the pair of cooling rolls 11 and 11 in the width direction. The pair of cooling rolls 11 and 11 and the pair of side weirs 15 and 15 define a molten steel storage section 16.

The tundish 18 holds molten steel 3 and supplies the molten steel 3 to the molten steel storage section 16 via the immersion nozzle 19 extending downward from the bottom of the tundish 18.

In the twin roll continuous casting device 10, the molten steel 3 comes into contact with the rotating cooling rolls 11 and 11, and is cooled to grow solidified shells 5 and 5 on the circumferential surfaces of the cooling rolls 11 and 11. Then, the solidified shells 5 and 5 formed on the pair of cooling rolls 11 and 11 are attached to each other by pressure at the roll kiss point to cast the slab 1 having a predetermined thickness.

Figure 3:
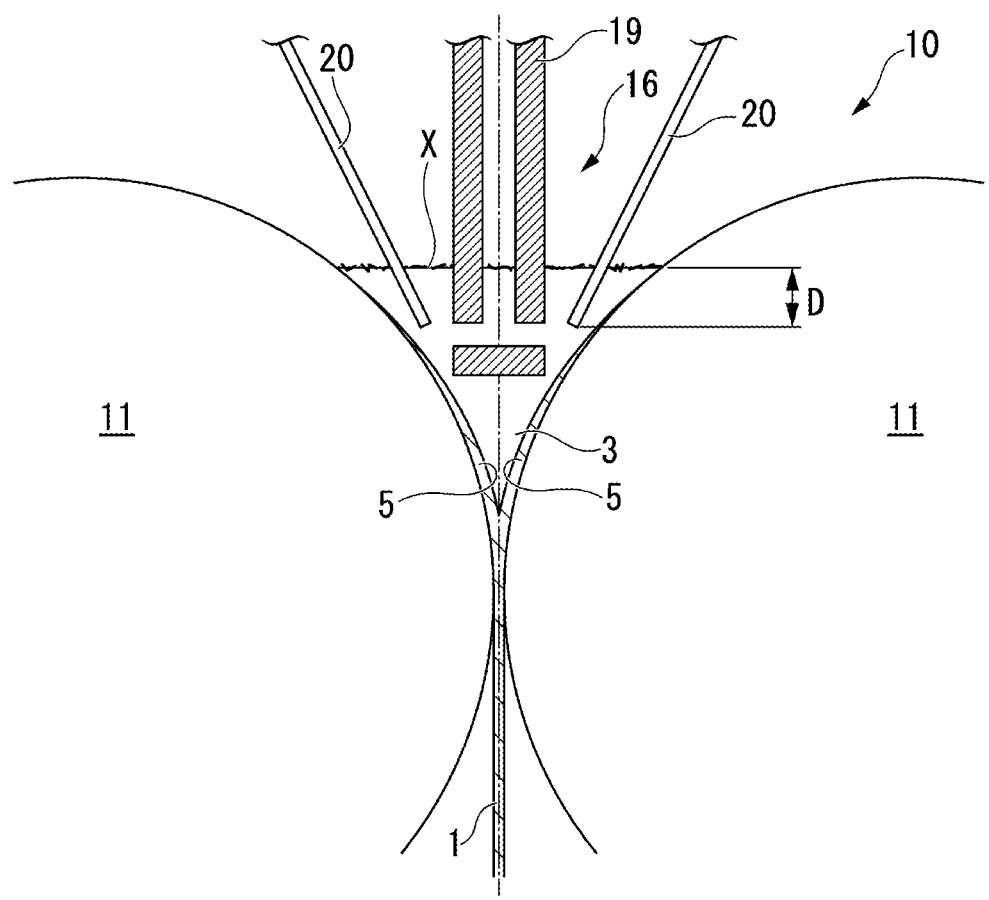
FIG. 3 is an explanatory sectional view of the molten steel storage section of the twin roll continuous casting device shown in FIG. 1.

As shown in FIG. 3, the molten steel 3 is stored in the molten steel storage section 16, and scum X including an alumina film and the like is formed on the molten steel surface.

Figure 2:
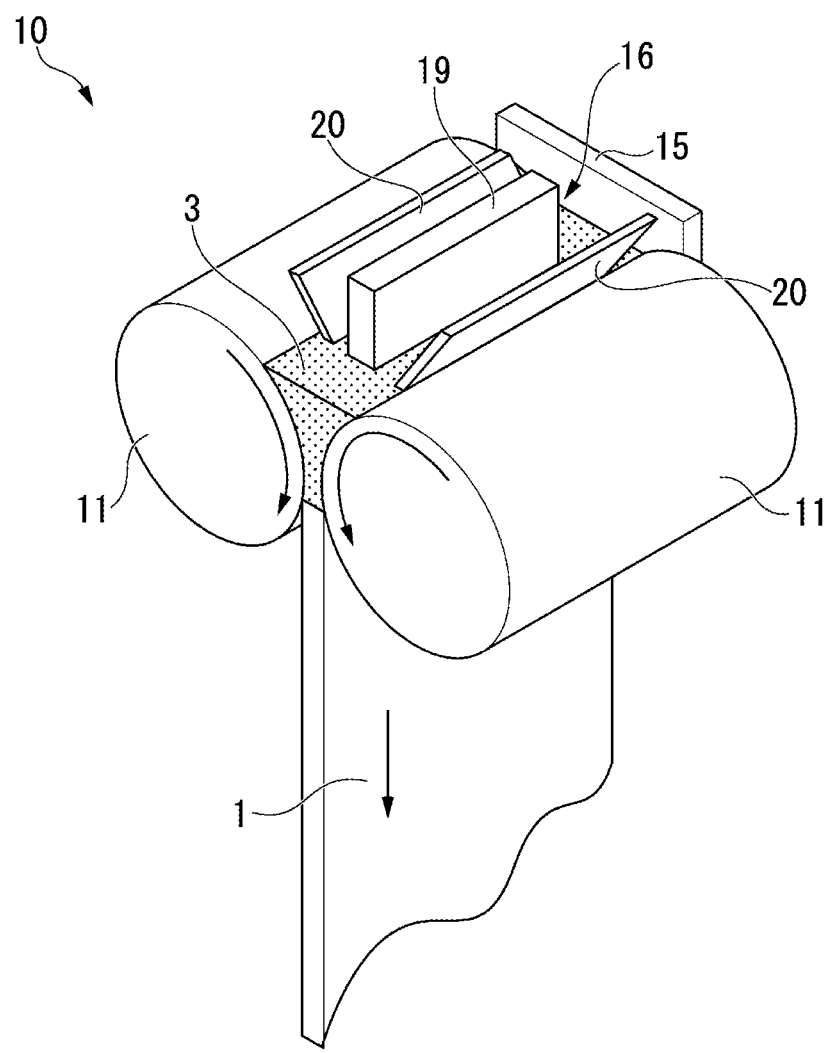
FIG. 2 is a partially enlarged explanatory view of the twin roll continuous casting device shown in FIG. 1.

In order to suppress the catching of the scum X in the cooling roll 11, the scum adsorbing member 20 is provided in the molten steel storage section 16. Specifically, as shown in FIGS. 2 to 4, the scum adsorbing member 20 is placed between the immersion nozzle 19 and the cooling rolls 11 and 11, and a part of the scum adsorbing member 20 is immersed in the molten steel 3.

The scum adsorbing member 20 according to the present embodiment has a rectangular flat plate shape, and as shown in FIG. 3, the immersion depth (vertical depth) D in the molten steel 3 is 5 mm or more. In the case that the immersion depth D is less than 5 mm, the scum X sometimes passes through the scum adsorbing member 20 because of the waviness and the surface flow on the surface of the molten steel storage section 16.

Figure 4:
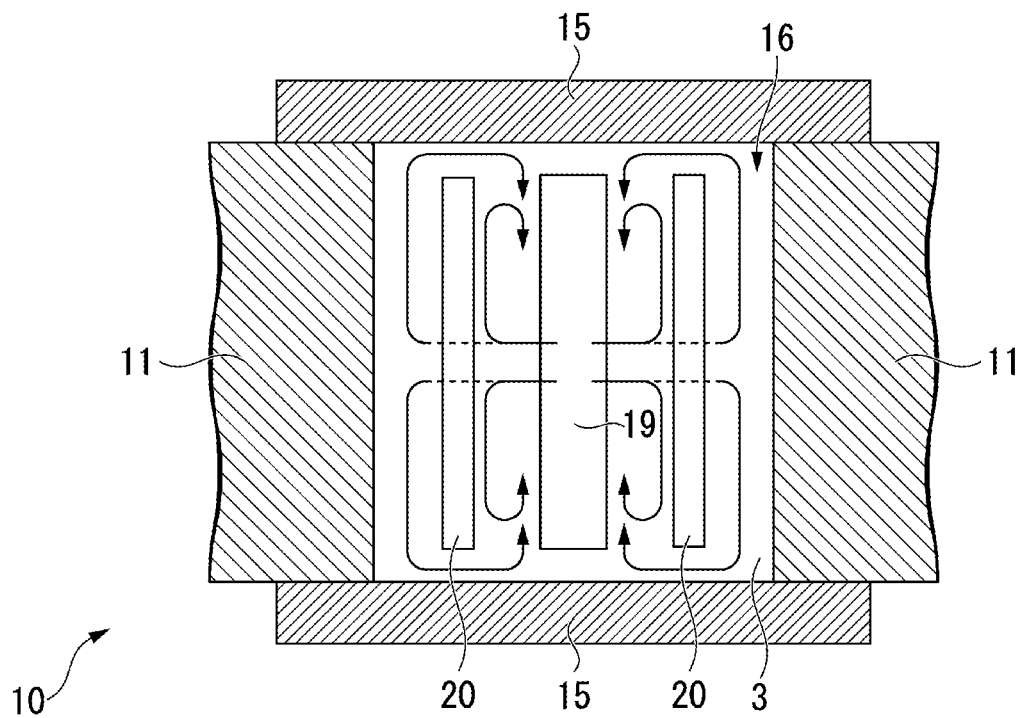
FIG. 4 is a schematic top view of the molten steel storage section shown in FIG. 3, showing the flow of molten steel discharged from the immersion nozzle.

FIG. 4 is a schematic top view showing the flow of the molten steel 3 discharged from the immersion nozzle 19. As shown in FIG. 4, in the case that the immersion depth D is 5 mm or more, the molten steel 3 can be stably circulated, and therefore the scum adsorbing member 20 can surely adsorb scum.

The scum adsorbing member 20 according to the present embodiment includes a refractory (an irregular refractory or a regular brick) containing a refractory metal oxide, and has 15% by volume or more and 70% by volume or less of pores. The volume ratio of the pores is preferably 20% by volume or more and less than 50% by volume.

Furthermore, in the scum adsorbing member 20 of the present embodiment, the average pore size of the pores is preferably 10 µm or more and less than 50 µm.

In addition, as the refractory metal oxide, at least one, or two or more selected from the group consisting of $Al_2O_3$, $ZrO_2$, MgO, $SiO_2$, and $CaO·6Al_2O_3$ are preferably used.

The volume ratio and the average pore size of the pores in the scum adsorbing member 20 and the refractory metal oxide are specified as described above for the reasons described below.

(Volume Ratio of Pores)

The scum adsorbing member 20 of the present embodiment has pores as described above, and it is possible to obtain action effects of the pores, such as improvement of the thermal shock resistance by ensuring the absorption space for thermal expansion, provision of the adsorption space for scum, and suppression of adhesion of a bare metal by reducing a heat transfer path.

In the case that the volume ratio of the pores is less than 15% by volume, there is a possibility that the above-described action effects of the pores will not be exhibited. Meanwhile, if the volume ratio of the pores is more than 70% by volume, the scum adsorbing member 20 has an insufficient strength, resulting in a possibility of breakage due to the molten steel flow.

Therefore, in the scum adsorbing member 20 of the present embodiment, the volume ratio of the pores is set within the range of 15% by volume or more and 70% by volume or less.

In order to make sure that the above-described action effects of the pores are exhibited, the lower limit of the volume ratio of the pores is preferably 20% by volume or more. Furthermore, in order to suppress breakage due to the molten steel flow surely, the upper limit of the volume ratio of the pores is preferably less than 50% by volume.

The porosity of the scum adsorbing member 20 can be controlled by using a lightweight aggregate or an organic fiber, or by adjusting the amount of water used during kneading.

The porosity after molding can be improved because the lightweight aggregate itself has pores. Furthermore, the porosity can be improved because the organic fiber and water disappear during heating to generate bubbles inside the molded product.

(Average Pore Size of Pores)

The pores in the scum adsorbing member 20 have an action of adsorbing scum as described above. By setting the average pore size of the pores to 10 µm or more, the permeation amount of scum is ensured, and scum can be sufficiently adsorbed. Meanwhile, by setting the average pore size of the pores in the scum adsorbing member 20 to less than 50 µm, the pores in the scum adsorbing member 20 and scum come into sufficient contact with each other, and scum can be sufficiently adsorbed.

Therefore, in the scum adsorbing member 20 of the present embodiment, the average pore size of the pores is set within the range of 10 µm or more and less than 50 µm. In order to make sure that the scum adsorption action is effective, the lower limit of the average pore size of the pores in the scum adsorbing member 20 is preferably 25 µm or more, and the upper limit of the average pore size of the pores is more preferably 40 µm or less.

The average pore size of the pores in the present embodiment was measured by mercury porosimetry (JIS R 1655 (2003)), and the pore size at a cumulative volume ratio of 50% was regarded as the "average pore size of the pores".

The average pore size of the pores can be adjusted by appropriately controlling the addition amount of an organic fiber and the amount of water during kneading. As a result, in the scum adsorbing member 20 of the present embodiment, unlike materials simply having many pores such as so-called porous heat insulating materials, it is possible to control the amount and the pore size of the pores that contribute to the adsorption of scum.

(Refractory Metal Oxide)

As the refractory metal oxide included in the scum adsorbing member 20 of the present embodiment, at least one, or two or more selected from the group consisting of $Al_2O_3$, $ZrO_2$, MgO, $SiO_2$, and $CaO·6Al_2O_3$ can be used.

In the case that $Al_2O_3$ is selected as a main component, the scum adsorbing member 20 having a relatively high strength can be obtained even if the porosity is high. In the case that $Al_2O_3$ is selected as a main component, by blending another component described below, deterioration of the corrosion resistance due to the highly adsorptive $Al_2O_3$ is suppressed by another component, erosion due to scum can be suppressed while the strength is maintained even if the scum adsorbing member 20 is porous, and a highly durable scum adsorbing member 20 can be obtained.

In the case that $ZrO_2$ is selected as a main component, the ability to suppress the adhesion of a bare metal can be improved because $ZrO_2$ has low thermal conductivity, and the effect of improving the corrosion resistance to scum can be obtained because $ZrO_2$ has high corrosion resistance to CaO.

In the case that $CaO·6Al_2O_3$ is selected as a main component, the ability to adsorb scum can be improved because the plate-like structure of $CaO·6Al_2O_3$ allows the scum adsorbing member 20 to have high porosity easily, and the effect of improving the corrosion resistance to scum can be obtained because $CaO·6Al_2O_3$ has high corrosion resistance to FeO.

In the case that MgO is selected as a main component, the corrosion resistance to scum can be obtained that is higher than that of $CaO·6Al_2O_3$ and $ZrO_2$ described above because MgO has high corrosion resistance to CaO and FeO.

In the case that $SiO_2$ is selected as a main component, the effect of improving the thermal shock resistance can be obtained because $SiO_2$ has a low coefficient of thermal expansion. As a result, in the case that the corrosion resistance is important and that relatively low porosity is desired, the scum adsorbing member 20 can have durability for being used stably even if a material is used that may cause reduction in the thermal shock resistance.

Because the above-described scum adsorbing member 20 according to the present embodiment includes a refractory containing a refractory metal oxide and has 15% by volume or more of pores, the absorption space for thermal expansion is ensured to improve the thermal shock resistance, and the scum adsorbing member 20 can sufficiently adsorb scum with the pores. In addition, because the volume ratio of the pores is 70% by volume or less, the strength is ensured to suppress breakage due to the flow of the molten steel 3 or the like.

As a result, the scum adsorbing member 20 is excellent in thermal shock resistance, and catching of scum can be sufficiently suppressed for a long period of time, therefore, it is possible to cast the slab 1 stably.

Furthermore, in the scum adsorbing member 20 according to the present embodiment, because the average pore size of the pores is within the range of 10 μm or more and less than 50 scum sufficiently permeates into the pores of the scum adsorbing member 20, and can be certainly adsorbed. Therefore, the catching of scum in the slab 1 can be further suppressed to produce the slab 1 having excellent surface quality.

In addition, in the scum adsorbing member 20 according to the present embodiment, because the refractory metal oxide is at least one, or two or more selected from the group consisting of $Al_2O_3$, $ZrO_2$, MgO, $SiO_2$, and $CaO\cdot 6Al_2O_3$, it is possible to apply the scum adsorbing member 20 depending on various casting conditions by selecting a material excellent in various properties such as scum adsorptivity, thermal shock resistance, and corrosion resistance to scum, resulting in stable casting of the slab 1 for a long period of time.

Furthermore, according to the twin roll continuous casting device 10 in which the scum adsorbing member 20 according to the present embodiment is used and according to the method of producing the slab 1, because the scum adsorbing member 20 is provided so that a part of the scum adsorbing member 20 is immersed in the molten steel storage section 16, the scum adsorbing member 20 can sufficiently adsorb scum. As a result, catching of scum in the cooling roll 11 can be suppressed. Furthermore, the scum adsorbing member 20 is excellent in thermal shock resistance and corrosion resistance, and therefore can be stably used for a long period of time. As a result, it is possible to cast the slab 1 having excellent surface quality stably.

The scum adsorbing member according to the embodiment of the present disclosure, the twin roll continuous casting device in which the scum adsorbing member is used, and the method of producing a slab have been specifically described above, but the present disclosure is not limited thereto, and can be appropriately modified without departing from the technical concept of the disclosure.

For example, in the present embodiment, as shown in FIG. 1, the twin roll continuous casting device provided with the pinch rolls has been described as an example, but the placement of the rolls and the like is not limited, and may be appropriately modified.

Furthermore, in the present embodiment, as shown in FIG. 1, the upper end of the scum adsorbing member 20 is connected to the bottom of the tundish 18, but the scum adsorbing member 20 may be suspended from the bottom of the tundish 18 with a rod-shaped member.

Figure 5:
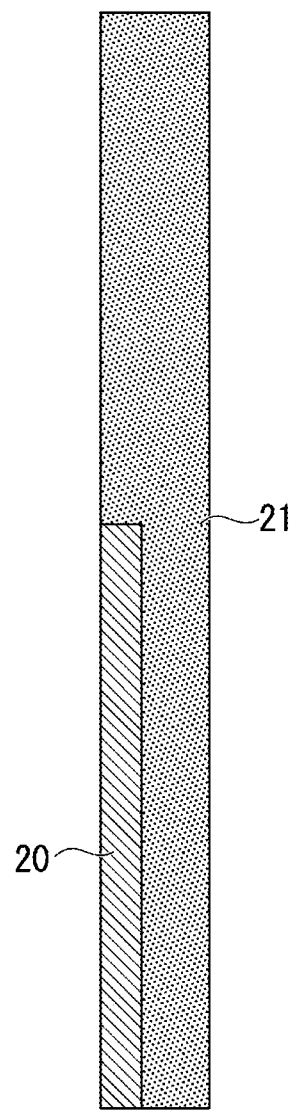
FIG. 5 is an explanatory view showing an aspect in which a scum adsorbing member is attached to a reinforcing member.

In the above-described embodiment, the case has been described in which the scum adsorbing member 20 is used as a single unit, but the present disclosure is not limited thereto. For example, as shown in FIG. 5, the scum adsorbing member 20 may be attached to a reinforcing member 21 and used as a composite.

The phenomena such as adsorption of scum and adhesion of a bare metal occur at the contact interface of a molten metal, therefore, if the scum adsorbing member 20 is placed at least at the portion in contact with the molten metal, the same action effects as those in the above-described embodiment can be exhibited. Therefore, if the composite of the scum adsorbing member 20 and the reinforcing member 21 is used, the size of the scum adsorbing member 20 can be reduced, and maintenance such as replacement or repair is easy.

As described above, the effects can be obtained without particularly limiting the porosity of the reinforcing member 21, which does not come into contact with a molten metal, therefore, it is preferable that only the scum adsorbing member 20, which adsorbs scum, be porous, and the porosity of the reinforcing member 21 be on the same level as conventional materials in order to maintain the properties, other than the scum adsorptivity, on the same level as conventional materials. Similarly, the material of the reinforcing member 21 is not limited to the same material as the scum adsorbing member 20.

The composite of the scum adsorbing member 20 and the reinforcing member 21 can be prepared by, for example, separate casting in which the reinforcing member 21 that is dense to ensure the strength is first cast using an irregular refractory, and then a porous material of the scum adsorbing member 20 is cast using a metal mold or a foam mold so that the porous material is cast around the reinforcing member 21. The composite can also be prepared by separately casting the reinforcing member 21 and the scum adsorbing member 20 and adhering them to each other with mortar.

In the case of forming a composite of the scum adsorbing member 20 and the reinforcing member 21, a porous sheet including a ceramic fiber may be used as the scum adsorbing member 20. The ceramic fiber needs to be, for example, an alumina fiber or a zirconia fiber. In the case of using such a porous sheet, a composite can be easily formed by attaching the porous sheet to one side or both sides of the reinforcing member 21 or wrapping the porous sheet around the reinforcing member 21.

In the composite shown in FIG. 5, if the thickness of the scum adsorbing member 20 is more than 0.5 mm, the portion for scum adsorption is ensured, and the scum adsorption effect can be maintained for a long period of time. Therefore, in the composite shown in FIG. 5, the thickness of the scum adsorbing member 20 is preferably more than 0.5 mm, and more preferably more than 3 mm.

The scum adsorption is caused by the open pores on the surface of the scum adsorbing member 20, and most of the open pores are located within 10 mm from the surface. Therefore, if the thickness of the scum adsorbing member 20 is more than 10 mm, the contribution of the increase in the thickness to the scum adsorption effect is small. Therefore, in the composite shown in FIG. 5, the upper limit of the thickness of the scum adsorbing member 20 is preferably 10 mm or less.

EXAMPLES

Hereinafter, the results of experiments conducted to confirm the effects of the present disclosure will be described.

Each of the refractory metal oxides shown in Tables 1 and 2 was used to prepare a compound, 11 mass % of alumina cement was added based on 100 mass % of the compound, cotton was added as a burn-off material, and the resulting mixture was kneaded with water, poured into a mold, cured for 24 hours, and then dried at 110° C. for 24 hours to prepare a scum adsorbing member. The porosity was controlled by the amounts of the burn-off material and the added water. Tables 1 and 2 show the amounts of the burn-off material and the added water by mass % based on 100 mass % of the base material.

With respect to the obtained scum adsorbing member, the volume ratio of the pores, the average pore size of the pores, the thermal shock resistance, the scum adsorptivity, the corrosion resistance, and the adhesive property to a bare metal were evaluated as follows. Tables 3 and 4 show the evaluation results.

(Volume Ratio of Pores)

The volume ratio of the pores (apparent porosity) was measured by a boiling method (JIS R 2205 (1992)). In order to determine the volume ratio of the pores in the surface layer region of the multi-layered scum adsorbing member, only the surface layer region was cut out and measured.

(Average Pore Size of Pores)

The average pore size of the pores was measured by mercury porosimetry (JIS R 1655 (2003)). In order to determine the average pore size of the pores in the surface layer region of the multi-layered scum adsorbing member, only the surface layer region was cut out and measured.

(Thermal Shock Resistance)

A thermal shock resistance test was performed to evaluate the thermal shock resistance under a condition that the refractory having a size of 40 mm×40 mm×160 mm was immersed in a hot metal at 1,550° C., held for 5 minutes, and then air-cooled. The series of heating and cooling operations was repeated, and the test result was described as "Bad" when the refractory was broken by repeating the series 5 times or less, "Good" when the refractory was broken by repeating the series 5 to 10 times, and "Very Good" when the refractory was maintained without breakage after repeating the series 11 times or more.

(Scum Adsorptivity)

On a hot metal at 1,550° C., 200 g of scum was floated, the refractory processed into a shape of 40 mm×100 mm×25 mm was immersed in the hot metal and held for 30 minutes, and then the increase in the weight of the refractory was determined to evaluate the scum adsorptivity. Tables 3 and 4 show the values standardized by the increase in the weight of the scum adsorbing member shown in Example 1. The composition of the scum was 38% FeO-24% $Al_2O_3$-14% CaO-24% $SiO_2$ by mass ratio. The large value indicates that a large amount of scum is adsorbed by the scum adsorbing member, and that the ability to adsorb scum can be maintained for a long period of time. Use of molten steel causes adhesion of a bare metal, therefore, a test was conducted using a hot metal in order to evaluate the adsorptivity of scum only. When the value was 100 or more, the refractory was accepted.

(Corrosion Resistance)

On molten steel at 1,550° C., 200 g of scum was floated, the refractory having a size of φ50 mm×150 mm was immersed in the molten steel and rotated at 150 rpm, and the dimensional change of the refractory at the interface between the scum and the molten steel was measured to evaluate the corrosion resistance to scum. Tables 3 and 4 show the values standardized by the dimensional change of the scum adsorbing member shown in Example 1. The large value indicates that erosion loss easily proceeds in the scum, and that the possibility of breakage due to erosion loss during use is increased. When the value was more than 80, the refractory was accepted.

(Adhesive Property to Bare Metal)

In molten steel at 1,580° C., the refractory having a size of 40 mm×40 mm×160 mm was immersed, held for 10 seconds, then pulled up from the molten steel, and air-cooled, and the increase in the weight of the refractory after the air-cooling was determined to evaluate the adhesive property to a bare metal. Tables 3 and 4 show the values standardized by the increase in the weight of the scum adsorbing member shown in Example 1. The large value indicates that a further large amount of the bare metal is adhered and that the possibility of catching a bare metal in a slab is increased. When the value was 100 or less, the refractory was accepted.

TABLE 1

| | | | Thickness | Composition of main component (mass %) | | | | | Burn-off material | Added water |
|---|---|---|---|---|---|---|---|---|---|---|
| | | Structure | (mm) | $Al_2O_3$ | $ZrCO_2$ | MgO | $SiO_2$ | CA6* | (mass %) | (mass %) |
| Example 1 | Single unit | Adsorbing member | 9 | 94 | — | — | — | — | 0 | 12 |
| Example 2 | Single unit | Adsorbing member | 9 | 94 | — | — | — | — | 1 | 13 |
| Example 3 | Single unit | Adsorbing member | 9 | 94 | — | — | — | — | 2 | 13 |
| Example 4 | Single unit | Adsorbing member | 9 | 94 | — | — | — | — | 2 | 15 |
| Example 5 | Single unit | Adsorbing member | 9 | 94 | — | — | — | — | 3 | 16 |
| Example 6 | Single unit | Adsorbing member | 9 | 80 | 14 | — | — | — | 0 | 12 |
| Example 7 | Single unit | Adsorbing member | 9 | 80 | 14 | — | — | — | 2 | 14 |
| Example 8 | Single unit | Adsorbing member | 9 | 80 | 14 | — | — | — | 3 | 16 |
| Example 9 | Single unit | Adsorbing member | 9 | 39 | 55 | — | — | — | 0 | 12 |
| Example 10 | Single unit | Adsorbing member | 9 | 39 | 55 | — | — | — | 2 | 14 |
| Example 11 | Single unit | Adsorbing member | 9 | 39 | 55 | — | — | — | 3 | 17 |

TABLE 1-continued

| | | Structure | Thickness (mm) | Composition of main component (mass %) | | | | | Burn-off material (mass %) | Added water (mass %) |
| --- | --- | --- | --- | --- | --- | --- | --- | --- | --- | --- |
| | | | | $Al_2O_3$ | $ZrCO_2$ | MgO | $SiO_2$ | CA6* | | |
| Example 12 | Single unit | Adsorbing member | 9 | 4 | 90 | — | — | — | 0 | 11 |
| Example 13 | Single unit | Adsorbing member | 9 | 4 | 90 | — | — | — | 2 | 13 |
| Example 14 | Single unit | Adsorbing member | 9 | 4 | 90 | — | — | — | 3 | 15 |
| Example 15 | Single unit | Adsorbing member | 9 | 80 | — | 14 | — | — | 0 | 12 |
| Example 16 | Single unit | Adsorbing member | 9 | 80 | — | 14 | — | — | 2 | 13 |
| Example 17 | Single unit | Adsorbing member | 9 | 80 | — | 14 | — | — | 3 | 16 |
| Example 18 | Single unit | Adsorbing member | 9 | 39 | — | 55 | — | — | 0 | 12 |
| Example 19 | Single unit | Adsorbing member | 9 | 39 | — | 55 | — | — | 2 | 14 |
| Example 20 | Single unit | Adsorbing member | 9 | 39 | — | 55 | — | — | 3 | 16 |
| Example 21 | Single unit | Adsorbing member | 9 | 4 | — | 90 | — | — | 0 | 11 |
| Example 22 | Single unit | Adsorbing member | 9 | 4 | — | 90 | — | — | 2 | 13 |
| Example 23 | Single unit | Adsorbing member | 9 | 4 | — | 90 | — | — | 3 | 16 |
| Example 24 | Single unit | Adsorbing member | 9 | 80 | — | — | 14 | — | 0 | 12 |
| Example 25 | Single unit | Adsorbing member | 9 | 80 | — | — | 14 | — | 2 | 14 |
| Example 26 | Single unit | Adsorbing member | 9 | 80 | — | — | 14 | — | 3 | 16 |
| Example 27 | Single unit | Adsorbing member | 9 | 39 | — | — | 55 | — | 0 | 13 |
| Example 28 | Single unit | Adsorbing member | 9 | 39 | — | — | 55 | — | 2 | 14 |
| Example 29 | Single unit | Adsorbing member | 9 | 39 | — | — | 55 | — | 3 | 16 |
| Example 30 | Single unit | Adsorbing member | 9 | 4 | — | — | 90 | — | 0 | 12 |
| Example 31 | Single unit | Adsorbing member | 9 | 4 | — | — | 90 | — | 2 | 13 |
| Example 32 | Single unit | Adsorbing member | 9 | 4 | — | — | 90 | — | 3 | 16 |
| Example 33 | Single unit | Adsorbing member | 9 | 80 | — | — | — | 14 | 0 | 12 |
| Example 34 | Single unit | Adsorbing member | 9 | 80 | — | — | — | 14 | 2 | 13 |
| Example 35 | Single unit | Adsorbing member | 9 | 80 | — | — | — | 14 | 3 | 14 |
| Example 36 | Single unit | Adsorbing member | 9 | 39 | — | — | — | 55 | 0 | 9 |
| Example 37 | Single unit | Adsorbing member | 9 | 39 | — | — | — | 55 | 2 | 11 |
| Example 38 | Single unit | Adsorbing member | 9 | 39 | — | — | — | 55 | 3 | 13 |
| Example 39 | Single unit | Adsorbing member | 9 | 4 | — | — | — | 90 | 0 | 10 |
| Example 40 | Single unit | Adsorbing member | 9 | 4 | — | — | — | 90 | 2 | 12 |
| Example 41 | Single unit | Adsorbing member | 9 | 4 | — | — | — | 90 | 3 | 14 |
| Example 42 | Single unit | Adsorbing member | 9 | 4 | 20 | — | — | 70 | 0 | 9 |
| Example 43 | Single unit | Adsorbing member | 9 | 4 | 20 | — | — | 70 | 2 | 10 |
| Example 44 | Single unit | Adsorbing member | 9 | 4 | 20 | — | — | 70 | 3 | 14 |
| Example 45 | Single unit | Adsorbing member | 9 | 4 | — | 70 | — | 20 | 0 | 12 |
| Example 46 | Single unit | Adsorbing member | 9 | 4 | — | 70 | — | 20 | 2 | 14 |
| Example 47 | Single unit | Adsorbing member | 9 | 4 | — | 70 | — | 20 | 3 | 16 |
| Example 48 | Composite | Adsorbing member | 8 | 94 | — | — | — | — | 3 | 16 |
| | | Reinforcing | 7 | 94 | — | — | — | — | 0 | 10 |

TABLE 1-continued

|  |  | Structure | Thickness (mm) | Composition of main component (mass %) | | | | | Burn-off material (mass %) | Added water (mass %) |
| --- | --- | --- | --- | --- | --- | --- | --- | --- | --- | --- |
|  |  |  |  | Al$_2$O$_3$ | ZrCO$_2$ | MgO | SiO$_2$ | CA6* | | |
| Example 49 | Composite | Adsorbing member | 8 | 4 | 90 | — | — | — | 3 | 15 |
|  |  | Reinforcing member | 7 | 94 | — | — | — | — | 0 | 10 |
| Example 50 | Composite | Adsorbing member | 8 | 4 | — | 70 | — | 20 | 0 | 12 |
|  |  | Reinforcing member | 7 | 4 | — | 70 | — | 20 | 0 | 10 |

*CA6: CaO•6Al$_2$O$_3$

TABLE 2

|  |  | Structure | Thickness (mm) | Composition of main component (mass %) | | | | | Burn-off material (mass %) | Added water (mass %) |
| --- | --- | --- | --- | --- | --- | --- | --- | --- | --- | --- |
|  |  |  |  | Al$_2$O$_3$ | ZrCO$_2$ | MgO | SiO$_2$ | CA6* | | |
| Comparative Example 1 | Single unit | Adsorbing member | 9 | 94 | — | — | — | — | 0 | 10 |
| Comparative Example 2 | Single unit | Adsorbing member | 9 | 94 | — | — | — | — | 3 | 17 |
| Comparative Example 3 | Single unit | Adsorbing member | 9 | 80 | 14 | — | — | — | 0 | 10 |
| Comparative Example 4 | Single unit | Adsorbing member | 9 | 80 | 14 | — | — | — | 3 | 18 |
| Comparative Example 5 | Single unit | Adsorbing member | 9 | 39 | 55 | — | — | — | 0 | 10 |
| Comparative Example 6 | Single unit | Adsorbing member | 9 | 39 | 55 | — | — | — | 3 | 18 |
| Comparative Example 7 | Single unit | Adsorbing member | 9 | 4 | 90 | — | — | — | 0 | 10 |
| Comparative Example 8 | Single unit | Adsorbing member | 9 | 4 | 90 | — | — | — | 3 | 16 |
| Comparative Example 9 | Single unit | Adsorbing member | 9 | 80 | — | 14 | — | — | 0 | 10 |
| Comparative Example 10 | Single unit | Adsorbing member | 9 | 80 | — | 14 | — | — | 3 | 18 |
| Comparative Example 11 | Single unit | Adsorbing member | 9 | 39 | — | 55 | — | — | 0 | 10 |
| Comparative Example 12 | Single unit | Adsorbing member | 9 | 39 | — | 55 | — | — | 3 | 17 |
| Comparative Example 13 | Single unit | Adsorbing member | 9 | 4 | — | 90 | — | — | 0 | 10 |
| Comparative Example 14 | Single unit | Adsorbing member | 9 | 4 | — | 90 | — | — | 3 | 17 |
| Comparative Example 15 | Single unit | Adsorbing member | 9 | 80 | — | — | 14 | — | 0 | 10 |
| Comparative Example 16 | Single unit | Adsorbing member | 9 | 80 | — | — | 14 | — | 3 | 18 |
| Comparative Example 17 | Single unit | Adsorbing member | 9 | 39 | — | — | 55 | — | 0 | 10 |
| Comparative Example 18 | Single unit | Adsorbing member | 9 | 39 | — | — | 55 | — | 3 | 17 |
| Comparative Example 19 | Single unit | Adsorbing member | 9 | 4 | — | — | 90 | — | 0 | 10 |
| Comparative Example 20 | Single unit | Adsorbing member | 9 | 4 | — | — | 90 | — | 3 | 17 |
| Comparative Example 21 | Single unit | Adsorbing member | 9 | 80 | — | — | — | 14 | 0 | 10 |
| Comparative Example 22 | Single unit | Adsorbing member | 9 | 80 | — | — | — | 14 | 3 | 16 |
| Comparative Example 23 | Single unit | Adsorbing member | 9 | 39 | — | — | — | 55 | 0 | 8 |
| Comparative Example 24 | Single unit | Adsorbing member | 9 | 39 | — | — | — | 55 | 3 | 15 |
| Comparative Example 25 | Single unit | Adsorbing member | 9 | 4 | — | — | — | 90 | 0 | 8 |
| Comparative Example 26 | Single unit | Adsorbing member | 9 | 4 | — | — | — | 90 | 3 | 15 |
| Comparative Example 27 | Single unit | Adsorbing member | 9 | 4 | 20 | — | — | 70 | 0 | 8 |

TABLE 2-continued

| | | Structure | Thickness (mm) | Composition of main component (mass %) | | | | | Burn-off material (mass %) | Added water (mass %) |
|---|---|---|---|---|---|---|---|---|---|---|
| | | | | $Al_2O_3$ | $ZrCO_2$ | MgO | $SiO_2$ | CA6* | | |
| Comparative Example 28 | Single unit | Adsorbing member | 9 | 4 | 20 | — | — | 70 | 3 | 15 |
| Comparative Example 29 | Single unit | Adsorbing member | 9 | 4 | — | 70 | — | 20 | 0 | 10 |
| Comparative Example 30 | Single unit | Adsorbing member | 9 | 4 | — | 70 | — | 20 | 3 | 17 |
| Comparative Example 31 | Composite | Adsorbing member | 2 | 94 | — | — | — | — | 3 | 16 |
| | | Composite | 13 | 94 | — | — | — | — | 0 | 10 |

*CA6: CaO•6Al$_2$O$_3$

TABLE 3

| | | Structure | Volume ratio of pores (% by volume) | Average pore size of pores (μm) | Thermal shock resistance | Scum adsorptivity | Corrosion resistance | Adhesive property to bare metal |
|---|---|---|---|---|---|---|---|---|
| Example 1 | Single unit | Adsorbing member | 16 | 13 | Good | 100 | 100 | 100 |
| Example 2 | Single unit | Adsorbing member | 28 | 22 | Good | 103 | 94 | 91 |
| Example 3 | Single unit | Adsorbing member | 35 | 28 | Very Good | 108 | 91 | 88 |
| Example 4 | Single unit | Adsorbing member | 47 | 38 | Very Good | 120 | 88 | 82 |
| Example 5 | Single unit | Adsorbing member | 68 | 49 | Good | 123 | 84 | 78 |
| Example 6 | Single unit | Adsorbing member | 17 | 14 | Good | 101 | 105 | 90 |
| Example 7 | Single unit | Adsorbing member | 40 | 32 | Very Good | 110 | 101 | 65 |
| Example 8 | Single unit | Adsorbing member | 65 | 48 | Good | 121 | 91 | 50 |
| Example 9 | Single unit | Adsorbing member | 16 | 13 | Good | 100 | 110 | 74 |
| Example 10 | Single unit | Adsorbing member | 38 | 30 | Very Good | 107 | 107 | 52 |
| Example 11 | Single unit | Adsorbing member | 67 | 47 | Good | 122 | 101 | 40 |
| Example 12 | Single unit | Adsorbing member | 17 | 14 | Good | 101 | 115 | 53 |
| Example 13 | Single unit | Adsorbing member | 39 | 31 | Very Good | 110 | 112 | 41 |
| Example 14 | Single unit | Adsorbing member | 66 | 49 | Good | 121 | 108 | 32 |
| Example 15 | Single unit | Adsorbing member | 16 | 13 | Good | 102 | 110 | 99 |
| Example 16 | Single unit | Adsorbing member | 39 | 31 | Very Good | 111 | 107 | 85 |
| Example 17 | Single unit | Adsorbing member | 66 | 49 | Good | 120 | 96 | 79 |
| Example 18 | Single unit | Adsorbing member | 16 | 13 | Good | 101 | 120 | 98 |
| Example 19 | Single unit | Adsorbing member | 41 | 33 | Very Good | 106 | 118 | 85 |
| Example 20 | Single unit | Adsorbing member | 67 | 49 | Good | 121 | 109 | 77 |
| Example 21 | Single unit | Adsorbing member | 17 | 14 | Good | 102 | 130 | 97 |
| Example 22 | Single unit | Adsorbing member | 40 | 32 | Very Good | 113 | 126 | 84 |
| Example 23 | Single unit | Adsorbing member | 68 | 49 | Good | 123 | 119 | 77 |
| Example 24 | Single unit | Adsorbing member | 16 | 13 | Very Good | 101 | 99 | 99 |
| Example 25 | Single unit | Adsorbing member | 42 | 34 | Very Good | 111 | 90 | 86 |
| Example 26 | Single unit | Adsorbing member | 66 | 48 | Very Good | 121 | 85 | 78 |
| Example 27 | Single unit | Adsorbing member | 16 | 13 | Very Good | 100 | 98 | 97 |

TABLE 3-continued

| | Structure | | Volume ratio of pores (% by volume) | Average pore size of pores (μm) | Thermal shock resistance | Scum adsorptivity | Corrosion resistance | Adhesive property to bare metal |
|---|---|---|---|---|---|---|---|---|
| Example 28 | Single unit | Adsorbing member | 39 | 31 | Very Good | 106 | 90 | 84 |
| Example 29 | Single unit | Adsorbing member | 66 | 48 | Very Good | 122 | 84 | 76 |
| Example 30 | Single unit | Adsorbing member | 17 | 14 | Very Good | 103 | 97 | 96 |
| Example 31 | Single unit | Adsorbing member | 42 | 34 | Very Good | 114 | 84 | 83 |
| Example 32 | Single unit | Adsorbing member | 68 | 49 | Very Good | 121 | 81 | 76 |
| Example 33 | Single unit | Adsorbing member | 16 | 13 | Good | 110 | 104 | 99 |
| Example 34 | Single unit | Adsorbing member | 44 | 35 | Very Good | 123 | 100 | 86 |
| Example 35 | Single unit | Adsorbing member | 68 | 49 | Good | 135 | 90 | 77 |
| Example 36 | Single unit | Adsorbing member | 17 | 14 | Good | 115 | 108 | 96 |
| Example 37 | Single unit | Adsorbing member | 42 | 34 | Very Good | 128 | 106 | 83 |
| Example 38 | Single unit | Adsorbing member | 69 | 49 | Good | 139 | 100 | 76 |
| Example 39 | Single unit | Adsorbing member | 16 | 13 | Good | 124 | 112 | 97 |
| Example 40 | Single unit | Adsorbing member | 43 | 34 | Very Good | 135 | 110 | 84 |
| Example 41 | Single unit | Adsorbing member | 66 | 48 | Good | 151 | 106 | 76 |
| Example 42 | Single unit | Adsorbing member | 15 | 12 | Good | 120 | 110 | 97 |
| Example 43 | Single unit | Adsorbing member | 42 | 34 | Very Good | 132 | 108 | 84 |
| Example 44 | Single unit | Adsorbing member | 65 | 47 | Good | 145 | 103 | 76 |
| Example 45 | Single unit | Adsorbing member | 17 | 13 | Good | 102 | 125 | 98 |
| Example 46 | Single unit | Adsorbing member | 41 | 32 | Very Good | 110 | 122 | 85 |
| Example 47 | Single unit | Adsorbing member | 68 | 49 | Good | 122 | 114 | 77 |
| Example 48 | Composite | Adsorbing member | 68 | 49 | Very Good | 123 | 84 | 78 |
| | | Reinforcing member | 14 | 11 | | | | |
| Example 49 | Composite | Adsorbing member | 66 | 49 | Very Good | 121 | 108 | 32 |
| | | Reinforcing member | 14 | 11 | | | | |
| Example 50 | Composite | Adsorbing member | 17 | 13 | Very Good | 102 | 125 | 98 |
| | | Reinforcing member | 14 | 13 | | | | |

TABLE 4

| | Structure | | Volume ratio of pores (% by volume) | Average pore size of pores (μm) | Thermal shock resistance | Scum adsorptivity | Corrosion resistance | Adhesive property to bare metal |
|---|---|---|---|---|---|---|---|---|
| Comparative Example 1 | Single unit | Adsorbing member | 14 | 11 | Good | 70 | 102 | 110 |
| Comparative Example 2 | Single unit | Adsorbing member | 72 | 58 | Bad | 125 | 78 | 75 |
| Comparative Example 3 | Single unit | Adsorbing member | 13 | 10 | Good | 69 | 106 | 98 |
| Comparative Example 4 | Single unit | Adsorbing member | 74 | 59 | Bad | 123 | 88 | 48 |
| Comparative Example 5 | Single unit | Adsorbing member | 14 | 11 | Bad | 70 | 115 | 81 |
| Comparative Example 6 | Single unit | Adsorbing member | 75 | 60 | Bad | 124 | 90 | 39 |

TABLE 4-continued

| | | Structure | Volume ratio of pores (% by volume) | Average pore size of pores (μm) | Thermal shock resistance | Scum adsorptivity | Corrosion resistance | Adhesive property to bare metal |
|---|---|---|---|---|---|---|---|---|
| Comparative Example 7 | Single unit | Adsorbing member | 14 | 13 | Bad | 81 | 117 | 56 |
| Comparative Example 8 | Single unit | Adsorbing member | 73 | 58 | Bad | 130 | 95 | 31 |
| Comparative Example 9 | Single unit | Adsorbing member | 14 | 11 | Good | 73 | 111 | 112 |
| Comparative Example 10 | Single unit | Adsorbing member | 72 | 58 | Bad | 126 | 91 | 74 |
| Comparative Example 11 | Single unit | Adsorbing member | 13 | 10 | Good | 74 | 121 | 113 |
| Comparative Example 12 | Single unit | Adsorbing member | 73 | 58 | Bad | 128 | 92 | 75 |
| Comparative Example 13 | Single unit | Adsorbing member | 14 | 12 | Bad | 85 | 132 | 121 |
| Comparative Example 14 | Single unit | Adsorbing member | 75 | 60 | Bad | 124 | 116 | 71 |
| Comparative Example 15 | Single unit | Adsorbing member | 14 | 11 | Good | 70 | 102 | 115 |
| Comparative Example 16 | Single unit | Adsorbing member | 73 | 58 | Good | 131 | 80 | 73 |
| Comparative Example 17 | Single unit | Adsorbing member | 13 | 10 | Good | 75 | 101 | 114 |
| Comparative Example 18 | Single unit | Adsorbing member | 72 | 58 | Good | 124 | 78 | 71 |
| Comparative Example 19 | Single unit | Adsorbing member | 14 | 11 | Good | 78 | 103 | 112 |
| Comparative Example 20 | Single unit | Adsorbing member | 72 | 58 | Good | 132 | 77 | 69 |
| Comparative Example 21 | Single unit | Adsorbing member | 14 | 11 | Good | 90 | 108 | 115 |
| Comparative Example 22 | Single unit | Adsorbing member | 73 | 58 | Bad | 145 | 86 | 70 |
| Comparative Example 23 | Single unit | Adsorbing member | 13 | 10 | Good | 95 | 115 | 116 |
| Comparative Example 24 | Single unit | Adsorbing member | 75 | 60 | Bad | 148 | 96 | 69 |
| Comparative Example 25 | Single unit | Adsorbing member | 14 | 12 | Good | 99 | 113 | 118 |
| Comparative Example 26 | Single unit | Adsorbing member | 74 | 59 | Bad | 146 | 97 | 70 |
| Comparative Example 27 | Single unit | Adsorbing member | 14 | 12 | Good | 98 | 112 | 117 |
| Comparative Example 28 | Single unit | Adsorbing member | 73 | 58 | Bad | 152 | 98 | 69 |
| Comparative Example 29 | Single unit | Adsorbing member | 14 | 13 | Good | 80 | 127 | 117 |
| Comparative Example 30 | Single unit | Adsorbing member | 74 | 59 | Bad | 126 | 104 | 73 |
| Comparative Example 31 | Composite | Adsorbing member | 68 | 49 | Bad | 77 | 84 | 78 |
| | | Reinforcing member | 14 | 11 | | | | |

As the volume ratio of the pores (apparent porosity) increased, the amount of the adsorbed scum increased, and the amount of the adhered bare metal tended to decrease. Meanwhile, although the increase in the volume ratio of the pores (apparent porosity) causes the reduction in the corrosion resistance, use of $ZrO_2$, MgO, and CA6 ($CaO \cdot 6Al_2O_3$) suppressed the reduction in the corrosion resistance. In addition, the use of $SiO_2$ resulted in the improvement of the thermal shock resistance of the scum adsorbing member.

From the above-described results, it has been confirmed that according to the present disclosure, it is possible to provide a scum adsorbing member that has thermal shock resistance so that the scum adsorbing member does not crack even when in contact with a molten metal even when it has been subjected to almost no preheating, is not subjected to erosion loss even under a casting time of longer than 6 hours, and absorbs scum in its pores and removes the scum by adsorption to suppress the catching of the scum in a solidified shell.

FIELD OF INDUSTRIAL APPLICATION

According to the present disclosure, it is possible to provide a scum adsorbing member that has thermal shock resistance so that the scum adsorbing member does not crack even when in contact with a molten metal even when it has been subjected to almost no preheating, is not subjected to erosion loss even under a casting time of longer than 6 hours, and absorbs scum in its pores and removes the scum by adsorption to suppress the catching of the scum in a solidified shell, a twin roll continuous casting device in which the scum adsorbing member is used, and a method of producing a slab.

BRIEF DESCRIPTION OF THE REFERENCE SYMBOLS

1 Thin slab (slab)
3 Molten steel
5 Solidified shell
11 Cooling roll
16 Molten steel storage section (molten metal storage section)
20 Scum adsorbing member
21 Reinforcing member

What is claimed is:

1. A scum adsorbing member provided in a twin roll continuous casting device which produces a slab by supplying a molten metal to a molten metal storage section formed by a pair of rotatable cooling rolls and a pair of side weirs, and forming and growing a solidified shell on each circumferential surface of the pair of cooling rolls, so that a part of the scum adsorbing member is immersed in the molten metal storage section, comprising:
a refractory containing a refractory metal oxide,
wherein the refractory metal oxide is, as a chemical composition, $Al_2O_3$ and at least one, or two or more selected from the group consisting of $ZrO_2$, MgO, $SiO_2$, and $CaO \cdot 6Al_2O_3$,
the scum adsorbing member has 15% by volume or more and 70% by volume or less of pores,
the scum adsorbing member is attached to a reinforcing member,
the scum adsorbing member includes a porous sheet including a ceramic fiber, and
the porous sheet is attached to the both sides of the reinforcing member.

2. The scum adsorbing member according to claim 1, wherein an average pore size of the pores is 10 µm or more and less than 50 µm.

3. The scum adsorbing member according to claim 1, wherein a volume ratio of the pores is 20% by volume or more and less than 50% by volume.

4. A twin roll continuous casting device comprising:
a molten metal storage section including a pair of rotatable cooling rolls that rotate and a pair of side weirs; and
a scum adsorbing member provided in a twin roll continuous casting device which produces a slab by supplying a molten metal to the molten metal storage section formed by the pair of rotatable cooling rolls and the pair of side weirs, and forming and growing a solidified shell on each circumferential surface of the pair of cooling rolls, so that a part of the scum adsorbing member is immersed in the molten metal storage section, comprising:
a refractory containing a refractory metal oxide,
wherein the refractory metal oxide is, as a chemical composition, $Al_2O_3$ and at least one, or two or more selected from the group consisting of $ZrO_2$, MgO, $SiO_2$, and $CaO \cdot 6Al_2O_3$,
the scum adsorbing member has 15% by volume or more and 70% by volume or less of pores, wherein
the slab is produced by supplying the molten metal to the molten metal storage section and forming and growing the solidified shell on each circumferential surface of the pair of cooling rolls,
the scum adsorbing member is attached to a reinforcing member,
the scum adsorbing member includes a porous sheet including a ceramic fiber, and
the porous sheet is attached to both sides of the reinforcing member.

5. A method of producing a slab, the method comprising:
supplying a molten metal to a molten metal storage section including a pair of rotatable cooling rolls that rotate and a pair of side weirs; and
forming and growing a solidified shell on each circumferential surface of the pair of cooling rolls, wherein
a scum adsorbing member provided in a twin roll continuous casting device which produces the slab by supplying the molten metal to the molten metal storage section formed by the pair of rotatable cooling rolls and the pair of side weirs, and forming and growing the solidified shell on each circumferential surface of the pair of cooling rolls, so that a part of the scum adsorbing member is immersed in the molten metal storage section, comprising:
a refractory containing a refractory metal oxide,
wherein the refractory metal oxide is, as a chemical composition, $Al_2O_3$ and at least one, or two or more selected from the group consisting of $ZrO_2$, MgO, $SiO_2$, and $CaO \cdot 6Al_2O_3$,
the scum adsorbing member has 15% by volume or more and 70% by volume or less of pores,
the scum adsorbing member is attached to a reinforcing member,
the scum adsorbing member includes a porous sheet including a ceramic fiber, and
the porous sheet is attached to both sides of the reinforcing member.

6. A scum adsorbing member provided in a twin roll continuous casting device which produces a slab by supplying a molten metal to a molten metal storage section formed by a pair of rotatable cooling rolls and a pair of side weirs, and forming and growing a solidified shell on each circumferential surface of the pair of cooling rolls, so that a part of the scum adsorbing member is immersed in the molten metal storage section, comprising:
a refractory containing a refractory metal oxide,
wherein the refractory metal oxide is, as a chemical composition, $Al_2O_3$ and at least one, or two or more selected from the group consisting of $ZrO_2$, MgO, $SiO_2$, and $CaO \cdot 6Al_2O_3$,
the scum adsorbing member has 15% by volume or more and 70% by volume or less of pores,
the scum adsorbing member is attached to a reinforcing member,
the scum adsorbing member includes a porous sheet including a ceramic fiber, and
the porous sheet is wrapped around the reinforcing member.

7. A twin roll continuous casting device comprising:
a molten metal storage section including a pair of rotatable cooling rolls that rotate and a pair of side weirs; and
a scum adsorbing member provided in a twin roll continuous casting device which produces a slab by supplying a molten metal to the molten metal storage section formed by the pair of rotatable cooling rolls and the pair of side weirs, and forming and growing a solidified shell on each circumferential surface of the pair of cooling rolls, so that a part of the scum adsorbing member is immersed in the molten metal storage section, comprising:
a refractory containing a refractory metal oxide, wherein the refractory metal oxide is, as a chemical composition, $Al_2O_3$ and at least one, or two or more selected from the group consisting of $ZrO_2$, MgO, $SiO_2$, and $CaO \cdot 6Al_2O_3$, the scum adsorbing member has 15% by volume or more and 70% by volume or less of pores, wherein the slab is produced by supplying the molten metal to the molten metal storage section and forming and growing the solidified shell on each circumferential surface of the pair of cooling rolls, the scum adsorbing member is attached to a reinforcing member, the scum adsorbing member includes a porous sheet including a ceramic fiber, and the porous sheet is wrapped around the reinforcing member.

8. A method of producing a slab, the method comprising:

supplying a molten metal to a molten metal storage section including a pair of rotatable cooling rolls that rotate and a pair of side weirs; and forming and growing a solidified shell on each circumferential surface of the pair of cooling rolls, wherein a scum adsorbing member provided in a twin roll continuous casting device which produces the slab by supplying the molten metal to the molten metal storage section formed by the pair of rotatable cooling rolls and the pair of side weirs, and forming and growing the solidified shell on each circumferential surface of the pair of cooling rolls, so that a part of the scum adsorbing member is immersed in the molten metal storage section, comprising:

a refractory containing a refractory metal oxide, wherein the refractory metal oxide is, as a chemical composition, $Al_2O_3$ and at least one, or two or more selected from the group consisting of $ZrO_2$, MgO, $SiO_2$, and $CaO \cdot 6Al_2O_3$, the scum adsorbing member has 15% by volume or more and 70% by volume or less of pores, the scum adsorbing member is attached to a reinforcing member, the scum adsorbing member includes a porous sheet including a ceramic fiber, and the porous sheet is wrapped around the reinforcing member.

* * * * *